United States Patent
Mayer et al.

(10) Patent No.: US 11,855,268 B2
(45) Date of Patent: Dec. 26, 2023

(54) BATTERY APPARATUS FOR AN ELECTRICALLY DRIVEN VEHICLE

(71) Applicant: LION Smart GmbH, Garching (DE)

(72) Inventors: Tobias Mayer, Munich (DE); Christian Behlen, Munich (DE)

(73) Assignee: LION SMART GmbH, Garching (DE)

( * ) Notice: Subject to any disclaimer, the term of this patent is extended or adjusted under 35 U.S.C. 154(b) by 0 days.

(21) Appl. No.: 16/956,023

(22) PCT Filed: Dec. 19, 2018

(86) PCT No.: PCT/EP2018/085923
§ 371 (c)(1),
(2) Date: Jun. 19, 2020

(87) PCT Pub. No.: WO2019/121970
PCT Pub. Date: Jun. 27, 2019

(65) Prior Publication Data
US 2020/0321667 A1   Oct. 8, 2020

(30) Foreign Application Priority Data

Dec. 20, 2017  (DE) ..................... 10 2017 223 438.5

(51) Int. Cl.
*H01M 10/625* (2014.01)
*H01M 10/6567* (2014.01)
(Continued)

(52) U.S. Cl.
CPC ..... *H01M 10/625* (2015.04); *H01M 10/6567* (2015.04); *H01M 50/204* (2021.01);
(Continued)

(58) Field of Classification Search
None
See application file for complete search history.

(56) References Cited

U.S. PATENT DOCUMENTS

2010/0061061 A1* 3/2010 Murata ............... H01M 10/613
  361/699
2010/0255359 A1* 10/2010 Hirakawa ............. H01M 50/30
  429/120
(Continued)

FOREIGN PATENT DOCUMENTS

CN   102544567 A   7/2012
CN   103069607 A   4/2013
(Continued)

OTHER PUBLICATIONS

Fire Barrier NPL (Year: 2013).*
(Continued)

*Primary Examiner* — Lisa S Park
(74) *Attorney, Agent, or Firm* — Ruggiero McAllister & McMahon LLC

(57) ABSTRACT

A battery apparatus for an electrically driven vehicle, having at least one battery module including individual battery cells is provided. The battery module has a module housing, which, for the purpose of regulating the temperature of the battery cells, is at least partly filled with temperature-regulating liquid and has a primary sealing apparatus to prevent leakage of the temperature-regulating liquid from the module housing. The battery module is furthermore accommodated in a module space of an enveloping housing, which has a secondary sealing apparatus to prevent leakage of temperature-regulating liquid from the enveloping housing.

12 Claims, 4 Drawing Sheets

(51) Int. Cl.
*H01M 50/26* (2021.01)
*H01M 50/271* (2021.01)
*H01M 50/231* (2021.01)
*H01M 50/204* (2021.01)

(52) U.S. Cl.
CPC ......... *H01M 50/231* (2021.01); *H01M 50/26* (2021.01); *H01M 50/271* (2021.01)

(56) References Cited

U.S. PATENT DOCUMENTS

| | | | | |
|---|---|---|---|---|
| 2012/0003508 | A1* | 1/2012 | Narbonne | H01M 50/24 429/8 |
| 2012/0183823 | A1* | 7/2012 | Von Borck | H01M 10/653 429/81 |
| 2013/0164567 | A1* | 6/2013 | Olsson | H01M 10/425 429/93 |
| 2013/0207459 | A1* | 8/2013 | Schroder | H01M 10/625 307/10.1 |
| 2015/0069068 | A1* | 3/2015 | Hariram | H01M 50/20 220/560.01 |
| 2016/0072103 | A1* | 3/2016 | Renn | H01M 50/24 429/185 |
| 2018/0062226 | A1* | 3/2018 | Raiser | H01M 10/6554 |

FOREIGN PATENT DOCUMENTS

| | | |
|---|---|---|
| DE | 10 2008 059 965 A1 | 6/2010 |
| DE | 10 2014 114 023 A1 | 3/2016 |
| DE | 10 2015 212 334 A1 | 1/2017 |
| DE | 10 2017 000 266 A1 | 7/2017 |
| EP | 0 454 017 A1 | 10/1991 |
| EP | 2 760 075 A1 | 7/2014 |
| EP | 3 176 849 A1 | 6/2017 |

OTHER PUBLICATIONS

International Search Report dated Apr. 1, 2019 from International Patent Application No. PCT/EP2018/085923, 7 pages.
Written Opinion dated Apr. 1, 2019 from International Patent Application No. PCT/EP2018/085923, 6 pages.
Chinese First Office Action dated May 26, 2022 from corresponding Chinese Patent Application No. 201880081733.9, 4 pages.

* cited by examiner

BATTERY APPARATUS FOR AN ELECTRICALLY DRIVEN VEHICLE

CROSS REFERENCE TO RELATED APPLICATION

This application claims the benefit under 35 U.S.C. § 119(a) of German Application No. 10 2017 223 438.5 filed on Dec. 20, 2017 and is a national stage application under 35 U.S.C. § 371, of PCT/EP2018/085923, filed on Dec. 19, 2018, the contents of both are incorporated by reference herein in their entirety.

BACKGROUND OF THE DISCLOSURE

1. Field of the Disclosure

The present invention relates to a battery apparatus for an electrically driven vehicle, an enveloping housing for such a battery apparatus and a method for mounting such a battery device.

2. Description of the Related Art

For the purposes of the present invention, electrically driven vehicles are vehicles which may have a battery apparatus to convert the electrical energy stored therein at least partially into motive power. These can be purely electrically powered vehicles, but also so-called plug-in hybrid vehicles or vehicles with range extenders. In order to provide the battery power or the electrical power for the drive, the battery apparatus must be kept within a specified temperature window. Temperatures that are too low or too high, depending on the outside temperature or due to heating during use of the battery apparatus, can hinder the power output or even damage the battery apparatus. Known battery apparatuses are therefore always equipped with a temperature control device which can introduce heat into the battery apparatus by means of a temperature control liquid to heat the battery apparatus or which can extract heat from the battery apparatus to cool it.

The disadvantage of the known solutions is that a great deal of effort has to be made to ensure that the tempering fluid does not escape from the battery apparatus in an undesirable manner. The battery apparatus of known solutions is usually in the form of a battery module with a large number of individual battery cells. Usually several such battery modules are connected next to each other or one above the other to the battery apparatus. This leads to a relatively complex circuitry for the guidance of the tempering fluid. The individual sections between the battery cells as well as the individual sections between levels of the battery modules and between adjacent battery modules must be sealed against undesired leakage of the tempering fluid for the transfer of the tempering fluid. On the one hand, this means that a large number of sealants have to be used at the corresponding joints between the individual adjacent components. On the other hand, the housing components of the individual sections must be manufactured with particular precision in order to meet high tolerance accuracy requirements in conjunction with the respective sealant and thus be able to guarantee the desired sealing performance with a high degree of reliability. Last but not least, a great deal of effort is required in terms of accuracy and safety when installing such battery apparatuses in order to be able to guarantee the desired seal against the leakage of tempering fluid.

SUMMARY

It is therefore the object of the present invention to at least partially eliminate the disadvantages described above. In particular, it is the object of the present invention to be able to guarantee a seal against the escape of tempering fluid with a high degree of safety in a cost-effective and simple manner.

The above object is solved by a battery apparatus with the features of claim 1, an enveloping housing with the features of claim 11 and a method with the features of claim 12. Further characteristics and details of the invention result from the dependent claims, the description and the drawings. Features and details described in connection with the battery apparatus according to the invention are of course also valid in connection with the envelope housing according to the invention as well as the method according to the invention and vice versa, so that with regard to the disclosure of the individual aspects of the invention reference is or can always be made to each other.

According to the invention, a battery apparatus is configured for an electrically powered vehicle. For this purpose, the battery apparatus comprises at least one battery module with a plurality of individual battery cells. The battery module is also equipped with a module housing which is at least partially filled with temperature control fluid to control the temperature of the battery cells. It is preferable to fill the module housing completely or essentially completely with the temperature control fluid. In addition, the module housing has a primary sealing apparatus to prevent the temperature control fluid from escaping from the module housing. Furthermore, the battery module is accommodated in a module space of an envelope housing, which has a secondary sealing apparatus to prevent temperature control fluid from escaping from the envelope housing.

Based on the known solutions of the battery apparatus, a two-stage or two-part fused sealing system is now given here. While in known solutions a multitude of individual sealants provided a primary sealing apparatus on the module housing of the battery module, this primary sealing apparatus has now been supplemented by a secondary sealing apparatus according to the invention. The secondary sealing apparatus can be configured in a much simpler and more cost-effective way, as it no longer has to be provided at a large number of individual seams or contact points between individual battery modules, between individual levels of a battery module and/or between individual battery cells, but rather has to provide a seal of a simple geometric envelope housing.

With known solutions, it was necessary that each individual seam provide the desired sealing functionality with a high degree of reliability. In the solution according to the invention, in the event of failure of a single such seam, i.e. failure at one point of the primary sealing device, the escape of temperature control fluid into the environment is further effectively prevented, since such an escape into the environment is stopped by a simple and inexpensive secondary sealing apparatus of the envelope housing. From a fluid-technical point of view, the envelope housing serves to collect the temperature control fluid in the event of failure of the primary sealing apparatus. The secondary sealing apparatus is preferably only used when the primary sealing apparatus has not or not completely fulfilled its function.

The two-stage sealing system of a battery apparatus according to the invention can provide a number of advantages. On the one hand, the safety against the leakage of tempering fluid from the battery apparatus is significantly increased, since the secondary sealing apparatus provides an additional barrier against such a leakage. In addition, it will be possible to make the individual sealants of the primary sealing apparatus simpler and cheaper or to be able to guarantee the respective assembly step faster and with less safety effort. In the event of a leakage or partial leakage, for example, a dripping of tempering fluid into the envelope housing, due to the reduced quality requirements for the sealant of the primary sealing apparatus, the presence of the secondary sealing apparatus effectively prevents the undesired escape of such a tempering fluid into the environment.

It should also be pointed out that not only the primary sealing apparatus itself, but also the correlating sealing surfaces and counter-sealing surfaces can be made available on the module housing more easily and more cost-effectively. This is due in particular to the fact that, based on the reduced production requirements, reduced demands on the tolerance accuracy of the individual components of the module housing are necessary. In addition to reduced production effort, this also leads to reduced production costs.

The corresponding sealing apparatus can have individual separate components, for example separate sealants, as well as a uniform and integral configuration with the structure of the respective housing.

For the purposes of the present invention, a tempering fluid is any fluid capable of transferring heat into the battery apparatus to the battery modules or from the battery modules out of the battery apparatus. The corresponding functionality is identical with known temperature control apparatuses for known battery apparatuses.

It may be advantageous, in a battery apparatus according to the invention, if a free space is formed between the at least one battery module and an inner wall of the envelope housing, which is at least partially, in particular completely or substantially completely, filled with a displacement material. The envelope housing is usually larger than the battery module accommodated therein In order to be able to ensure simple and easy or clamp-free insertion of the at least one battery module into the module space, a clearance is usually provided which, after insertion of the at least one battery module, forms a free space between the module housing and an inner wall of the envelope housing. Such a free space is now filled with a displacement material in this form of the present invention. This means that in the event of a leakage of the primary sealing apparatus, the displacement material fills the free space and the free volume otherwise available there and thus no longer makes available for the tempering fluid to leak into such free space. In other words, in the event of a leak, the displacement material displaces escaping tempering fluid or directly prevents it from entering a reduced free space in the envelope housing. In the event of a leakage, this leads to significantly less tempering fluid escaping from the module housing than if such a free space were present. The less temperature control fluid leaks out of the module housing in the event of a leak, the greater the certainty that the temperature control functionality within the battery module will continue to operate at high efficiency. It is preferable to minimize the free space, i.e. the displacement material fills the free space completely or essentially completely.

In the case of an embodiment according to the previous paragraph, there are advantages if the battery apparatus has a foam material in the displacement material, in particular with at least partially closed foam pores. A foam material has several advantages. On the one hand, a foam material can be introduced into the free space particularly easily and cost-effectively. Preferably, a foamable liquid is introduced, which foams up after being introduced, for example through activation or chemical reaction. Thus, the free space is effectively closed by the foam material as displacement material and in particular filled with the foam pores in a closed manner. The use of a foam material with closed foam pores means that no tempering fluid can penetrate such closed foam pores in the event of a leak. However, because such foam pores are closed but hollow inside, the use of such a foam can combine a high displacement effect with a light construction of the displacement material and thus a low weight of the battery apparatus.

It is also conceivable that in a battery apparatus according to the invention, the displacement material contains a liquid, in particular the tempering liquid. Of course, different displacement materials of a single battery apparatus can also be combined with each other. The use of the tempering fluid as a displacement material allows the complexity to be reduced, as no additional material for the displacement material has to be used in the production method. In the event of a leakage, the identity between the tempering fluid as a displacement material and the escaping tempering fluid means that chemical reactions between the fluids can be prevented with absolute certainty. It can be advantageous if possible, ribs or flow baffles determine the liquid as displacement material and avoid undesired blurring. It is also particularly easy and inexpensive to introduce a liquid into the free space.

There may be further advantages if, in a battery apparatus of the invention, the displacement material contains a solid, especially in the form of a bulk material. A bulk material can be a free-flowing solid, for example, which can also be introduced into the free space in this way simply and cost-effectively. Preferably, such a solid can also have pores, for example pores in closed form, in order to provide a high displacement effect at a low dead weight, as has already been explained in more detail with regard to the foam material.

It may also be advantageous if, in the case of a battery apparatus of the invention, the envelope housing is at least in two parts and has a trough section with a connecting section and a lid section with a counter-connecting section. The at least one battery module is accommodated in the trough section and the lid section is connected to the connecting section via its counter-connecting section in a liquid-tight manner. Such a multi-part configuration of the envelope housing leads to simple and cost-effective production possibilities. This means that the individual components of the envelope housing can be easily manufactured, for example by means of an injection molding method, especially from a plastic material. For mounting, the trough section can be used directly to hold at least one battery module, so that pre-fixing or pre-positioning in the module space still to be closed can be guaranteed. Closing the module space by means of the lid section not only provides mechanical protection, but also ensures a liquid-tight connection for the configuration of the secondary sealing apparatus.

In a battery apparatus as described in the preceding paragraph, it is advantageous if the trough section has a sealing surface and the lid section has a counter-sealing surface, which are in liquid-sealing contact with each other, in particular via a separate sealant. This ensures that the desired sealing function of the secondary sealing apparatus can be made available separately from the connection between the connecting section and the counter-connecting section. Especially with the help of a separate sealant, a lower tolerance requirement can be achieved in the production of the individual components of the envelope housing.

It is also advantageous if, in the case of a battery apparatus of the two preceding paragraphs, the connecting section is reversibly or irreversibly connected to the counter-connecting section. Such a connection can be made available by gluing, welding or irreversible locking, for example. This means that the sealing functionality of the secondary sealing apparatus can be made available simply, cost-effectively and, in particular, in functional union with the connection functionality by irreversible, in particular liquid-tight connection.

A further advantage can be achieved if, in a battery apparatus according to the invention, the envelope housing has at least one functional passage for the passage of at least one functional means into the module space of the envelope housing, in particular for at least one of the following functional means:
- electrical connection line to the at least one battery module;
- liquid line for the temperature control liquid to the at least one battery module; and
- data line to the at least one battery module.

The above list is not exhaustive. In order not to impair the functionality of the battery apparatus, the function pass can be provided for individual function passage. In order to avoid this being a weak point in the envelope housing, the functional passage is preferably also equipped with the secondary sealing apparatus, so that a seal against the undesired escape of temperature control fluid from the enclosure is ensured even if electrical connecting lines, fluid lines, data lines or similar lines are passed through.

It is also advantageous if the envelope housing of a battery apparatus according to the invention is at least partially mechanically stable. In contrast to a flexible and/or elastic, preferably skin-like configuration, which is also possible in principle, this means that mechanical stabilization or mechanical protection of the individual battery modules can be provided as an additional functionality. This is further enhanced if a corresponding mechanical damping effect by an inserted displacement material additionally provides a protective function for the battery modules.

A further object of the present invention is an envelope housing for a battery apparatus according to the invention, comprising an inner wall surrounding a module space for accommodating at least one battery module. This inner wall or the envelope housing is sealed against the escape of tempering fluid from the envelope housing. Thus, an envelope housing according to the invention brings the same advantages as those explained in detail with respect to a battery apparatus according to the invention.

Another subject of the present invention is a method for assembling a battery apparatus according to the invention, comprising the following steps:
- Insertion of at least one battery module into the module space of an envelope housing according to the present invention,
- liquid-tight closing of the module space to prevent tempering liquid from escaping from the enveloping housing.

By forming a battery apparatus according to the invention, a method according to the invention brings the same advantages as those explained in detail with respect to a battery apparatus according to the invention.

A method according to the invention can be further developed to the effect that, before closing the module space, a remaining free space between an inner wall of the envelope housing and the at least one battery module is at least partially filled with a displacement material. The displacement material and advantages were also explained in detail with reference to a corresponding embodiment of the battery apparatus.

BRIEF DESCRIPTION OF THE DRAWINGS

Further advantages, features and details of the invention are given in the following description, in which, with reference to the drawings, embodiments of the invention are described in detail. The features mentioned in the claims and in the description may be individually or in any combination substantially inventive. They are schematically shown:

DETAILED DESCRIPTION

Figure 1:
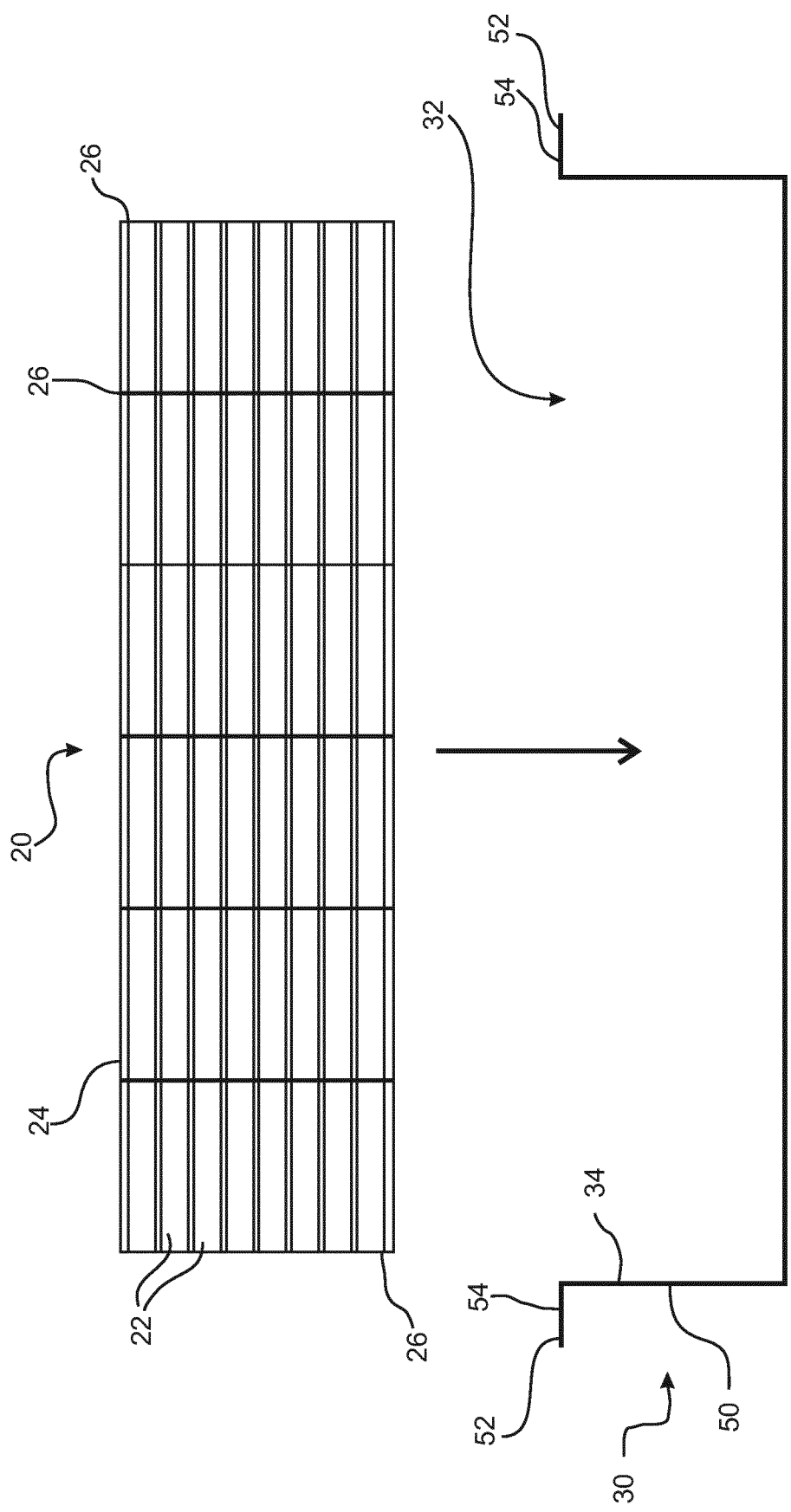
FIG. 1 shows the embodiment of a battery apparatus according to the invention during a first assembly step.
Figure 2:
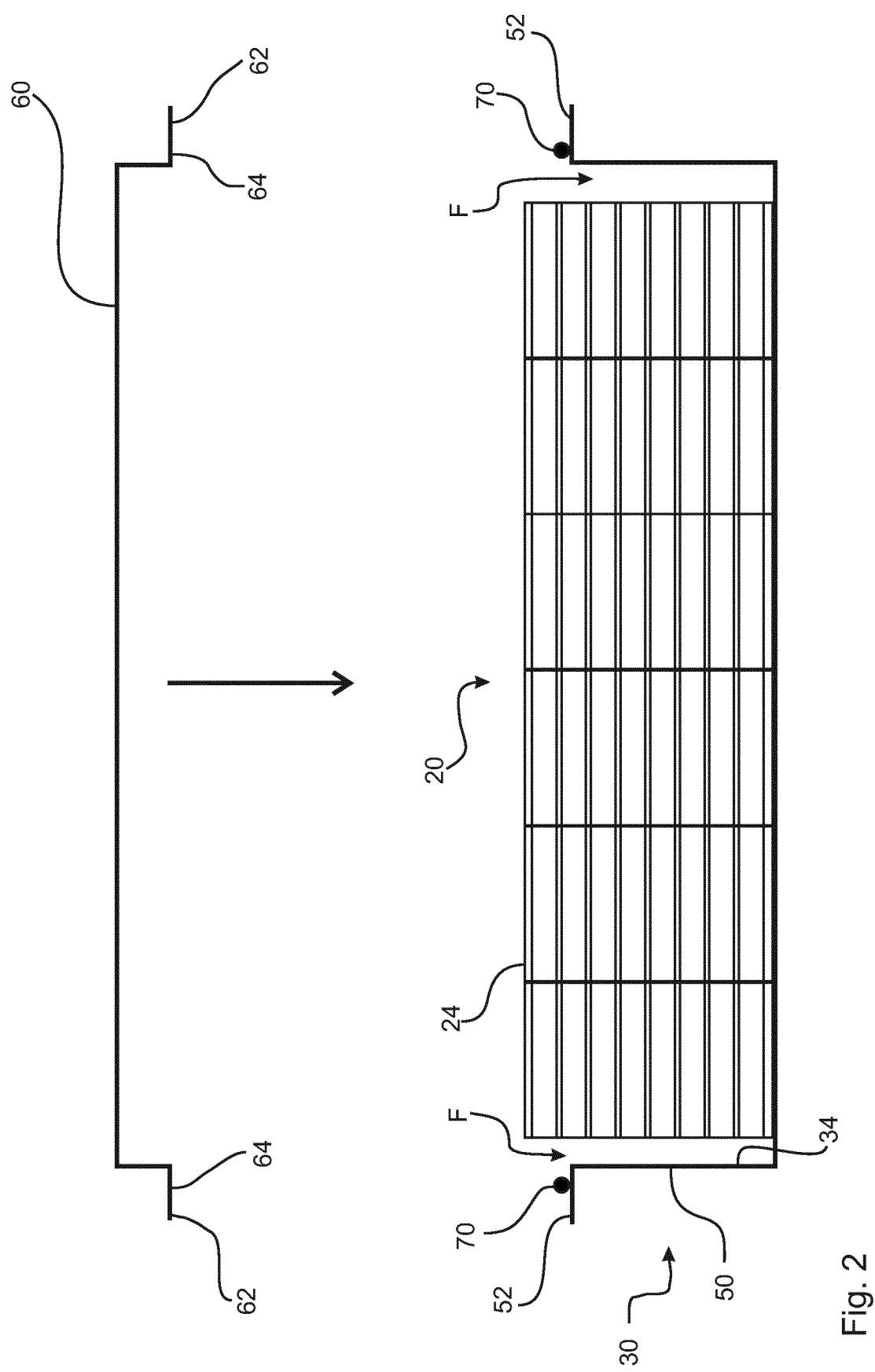
FIG. 2 shows the embodiment of FIG. 1 for a further assembly step.
Figure 3:
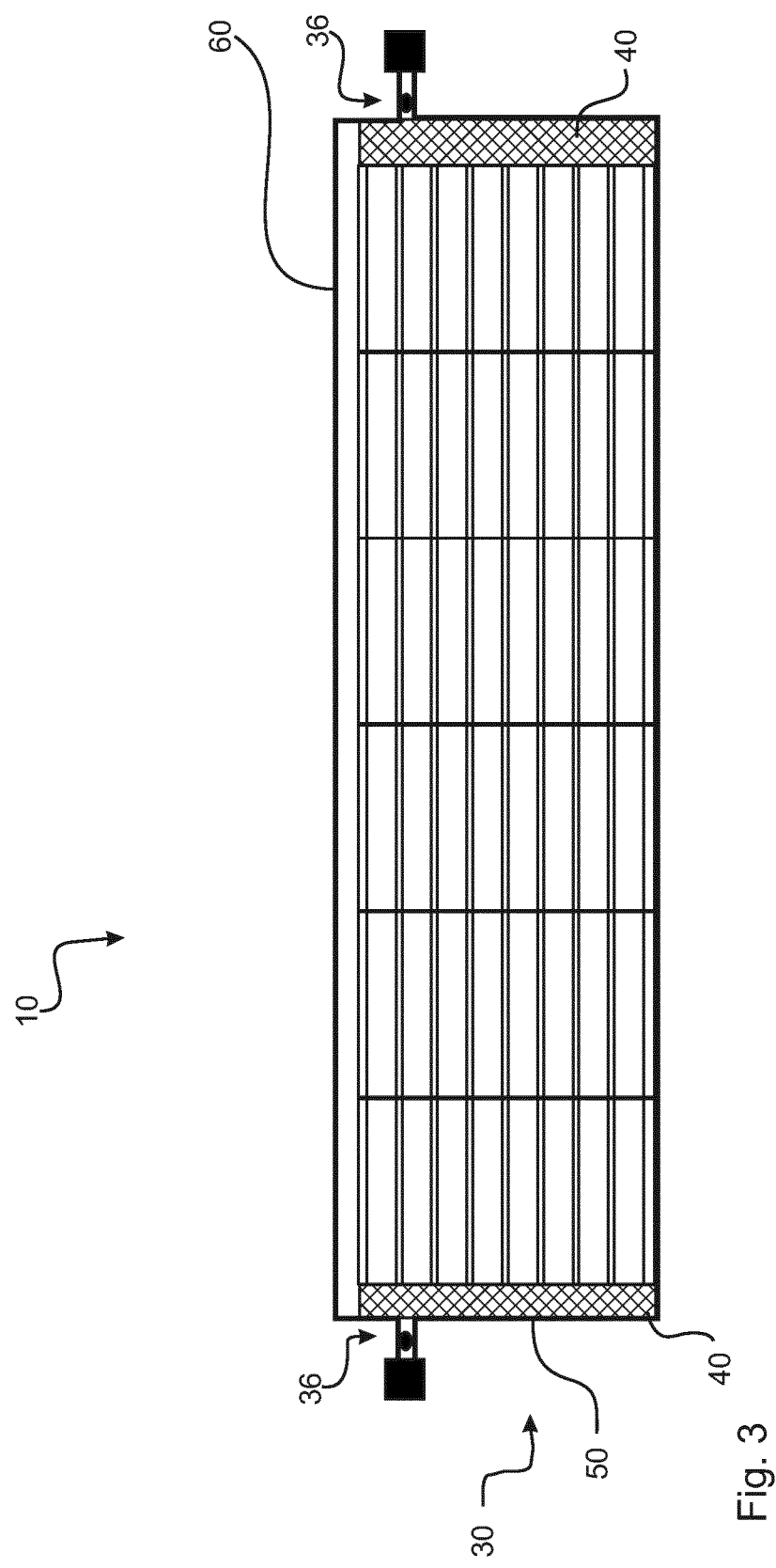
FIG. 3 shows the embodiment of FIGS. 1 and 2 after completion of the assembly.

FIGS. 1 to 3 illustrate a method for manufacturing a battery apparatus 10 according to the present invention. In FIG. 1 it can be seen that a trough section 50 of a multi-part envelope housing 10 is provided. This trough section 50 already defines a large part of the holding space 32 of the envelope housing 30. A battery module 20 can now be inserted into this module space 32 from above along the direction of the arrow as shown in FIG. 1.

In FIG. 1 you can also clearly see that the battery module 20 shown here is equipped with a module housing 24. The module housing 24 surrounds a large number of individual battery cells 22, which in turn are arranged from left to right and are connected or arranged separately from each other on individual levels. To ensure that tempering fluid, which is arranged inside the module housing 24 for tempering the individual battery cells 22, does not leak, individual sealing elements of a primary sealing apparatus 26 are arranged at the individual joints between the levels as well as at the end points of the module housing 24. FIG. 1 schematically shows the respective position left and right at the end of the module housing 24 as well as an exemplary seam between the right and the penultimate level of the battery cells 22. Naturally, appropriate sealants are also provided at all other joints to form the primary sealing apparatus 26.

After inserting the battery module 20 in the position as shown in FIG. 2, a free space F remains on the left and right side between the battery module 20 and the inner wall 34 of the envelope housing 30. This free space F is now filled with a displacement material 40, as will be explained later in FIGS. 3 and 4.

For the further formation of a secondary sealing apparatus 36, a separate sealant 70 is arranged on the sealing surface 54 of the trough section 50 next to the connecting section 52 in this embodiment. Subsequently, module space 32 can be closed by placing lid section 60 from above along the direction of the arrow. The end of this method is shown in FIG. 3, for example. The lid section 60 is now in place and closes module space 32, in which not only the battery module 20, but also the displacement material 40, here preferably in the form of a foam material with at least partially closed foam pores, is filled or inserted to the left and right. The envelope housing 30 is thus closed and is irreversibly sealed on the left and right between connection section 52 and counter connecting section 62. In order to ensure the sealing effect of the secondary sealing apparatus 36, a desired sealing force is additionally applied to the sealant 70 by means of appropriate squeezing.

Figure 4:
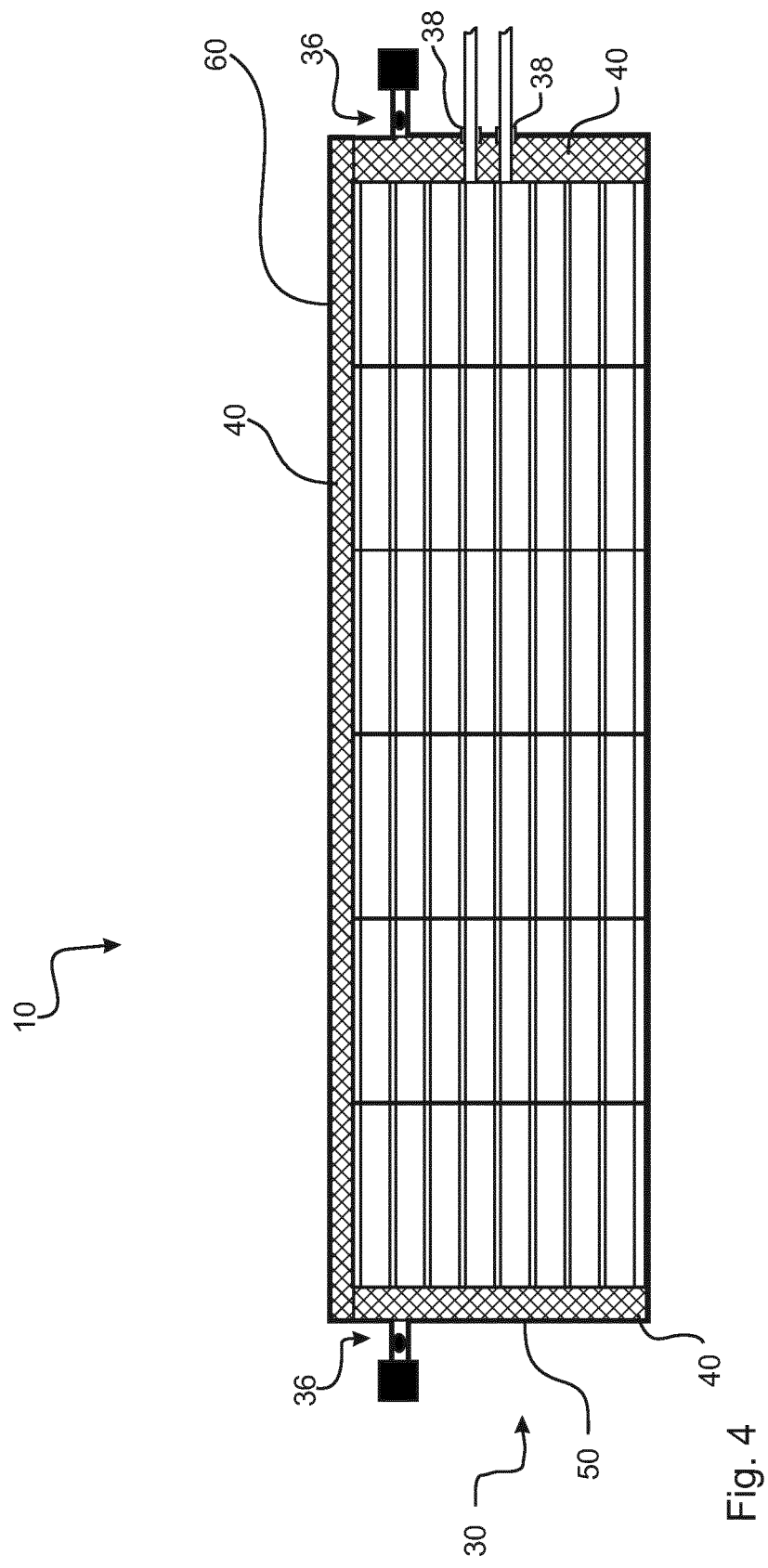
FIG. 4 is a further embodiment of a battery apparatus according to the invention.

FIG. 4 is a further embodiment of a battery apparatus 10. Based on the embodiment of FIG. 3, a free space F still available at the top is also equipped with displacement material 40. In addition, one passageway for the supply or discharge of media, data or electrical power is visible in the form of two functional passages 38 on the right side of the trough section 50 of the envelope housing 30. The secondary sealing apparatus 36 preferably also extends to these function passages 38, so that here too an effective seal against undesired leakage of the temperature control fluid from the envelope housing 30 is ensured.

The preceding explanation of the forms of embodiments describes the present invention exclusively in the context of embodiments. Of course, individual features of the embodiments can be freely combined with each other, if technically reasonable, without leaving the scope of the present invention.

REFERENCE SIGNS 10 battery apparatus
20 battery module
22 battery cell
24 module housing
26 primary sealing apparatus
30 enveloping housing
32 module space
34 inner wall
36 secondary sealing apparatus
38 Functional passage
40 displacement material
50 trough section
52 connecting section
54 sealing surface
60 lid section
62 counter-connecting section
64 counter-sealing surface
70 sealant
F free space

What is claimed is:

1. A battery apparatus for an electrically driven vehicle, having at least one battery module comprising a plurality of individual battery cells,
   wherein the at least one battery module has a module housing that is at least partly filled with temperature-regulating liquid to regulate a temperature of the battery cells and has a primary sealing apparatus to prevent leakage of the temperature-regulating liquid from the module housing,
   wherein the at least one battery module is accommodated in a module space of an enveloping housing, which has a secondary sealing apparatus to prevent leakage of temperature-regulating liquid from the enveloping housing;
   wherein the at least one battery module and an inner wall of the enveloping housing form therebetween a free space that is at least partially filled with a displacement material, and
   wherein the displacement material comprises a material selected from the group consisting of: a foam material, a liquid and a solid;
   wherein the enveloping housing is formed in at least two parts and comprises a trough section with a connecting section and a lid section with a counter-connecting section;
   wherein the at least one battery module is received in the trough section and the lid section is connected to the connecting section in a liquid-tight manner via its counter-connecting section;
   wherein the trough section has a sealing surface and the lid section has a counter-sealing surface, which are in liquid-tight contact with each other via a separate sealant; and
   wherein the connecting section is irreversibly connected to the counter-connecting section by a welded connection.

2. The battery apparatus according to claim 1, wherein the enveloping housing has at least one functional passage for the passage of at least one functional means into the module space of the enveloping housing.

3. The battery apparatus according to claim 1, wherein the enveloping housing is configured to be mechanically stable at least in sections.

4. An enveloping housing for a battery apparatus of claim 1, further comprising an inner wall which surrounds a module space for receiving at least one battery module and against which an outlet of tempering liquid from the enveloping housing is sealed.

5. A method of assembling a battery apparatus having the features of claim 1, comprising the following steps:
   inserting the at least one battery module into the module space of the enveloping housing, wherein the enveloping housing further comprises an inner wall which surrounds the module space for receiving the at least one battery module and against which an outlet of tempering liquid from the enveloping housing is sealed, and
   liquid-tight closing of the module space to prevent tempering liquid from escaping from the enveloping housing.

6. The method according to claim 5, wherein before closing the module space, a free space still present between the inner wall of the enveloping housing and the at least one battery module is at least partially filled with a displacement material.

7. The battery apparatus according to claim 1, wherein the free space is completely filled with a displacement material.

8. The battery apparatus according to claim 1, wherein the free space is substantially filled with a displacement material.

9. The battery apparatus according to claim 1, wherein the foam material has at least partially closed foam pores.

10. The battery apparatus according to claim 1, wherein the displacement material comprises the tempering liquid.

11. The battery apparatus according to claim 1, wherein the solid is in the form of a bulk material.

12. The battery apparatus according to claim 2, wherein at least one functional passage for the passage of at least one of the following functional means into the module space include:
   an electrical connection line to the at least one battery module;
   a liquid line for tempering liquid to the at least one battery module;
   a data line to the at least one battery module.

* * * * *